United States Patent
Liu et al.

(10) Patent No.: US 9,801,004 B2
(45) Date of Patent: Oct. 24, 2017

(54) DEVICE, METHOD, AND SYSTEM FOR SECURELY PAIRING MOBILE COMMUNICATION DEVICES USING MOVEMENT

(75) Inventors: Zhanglin Liu, Beijing (CN); Peng Guo, Beijing (CN); Gansha Wu, Beijing (CN)

(73) Assignee: Intel Corporation, Santa Clara, CA (US)

( * ) Notice: Subject to any disclaimer, the term of this patent is extended or adjusted under 35 U.S.C. 154(b) by 27 days.

(21) Appl. No.: 13/997,417

(22) PCT Filed: Jun. 29, 2012

(86) PCT No.: PCT/CN2012/000889
§ 371 (c)(1),
(2), (4) Date: Sep. 20, 2013

(87) PCT Pub. No.: WO2014/000124
PCT Pub. Date: Jan. 3, 2014

(65) Prior Publication Data
US 2014/0206288 A1    Jul. 24, 2014

(51) Int. Cl.
*H04W 4/00* (2009.01)
*H04M 1/725* (2006.01)
(Continued)

(52) U.S. Cl.
CPC .......... *H04W 4/008* (2013.01); *H04M 1/7253* (2013.01); *H04W 4/027* (2013.01);
(Continued)

(58) Field of Classification Search
CPC ..... H04W 4/008; H04W 4/206; H04W 12/06; H04W 88/02; H04M 1/7253; G06F 3/017; G06F 3/0346; H04L 67/18
See application file for complete search history.

(56) References Cited

U.S. PATENT DOCUMENTS 7,907,901 B1    3/2011   Kahn et al.
8,140,115 B1 *  3/2012   Kahn et al. ............... 455/556.1
(Continued)

FOREIGN PATENT DOCUMENTS

CN    101491066 A    7/2009
CN    102273184 A    12/2011
(Continued)

OTHER PUBLICATIONS

International Search Report and Written Opinion received for International Application No. PCT/CN2012/000889, Mar. 28, 2013, 11 pages.
(Continued)

*Primary Examiner* — Ping Hsieh
*Assistant Examiner* — James Yang
(74) *Attorney, Agent, or Firm* — Barnes & Thornburg LLP

(57) ABSTRACT

A device, method, and system for securely pairing mobile communication devices using device movement includes capturing a begin movement, capturing arbitrary pairing movement, and capturing an end movement. The mobile communication devices verify that they are within a secure range during the pairing process. The captured pairing movement may be normalized, depending on the relative orientation of the mobile communication devices. The captured pairing movement data of each mobile communication device is compared. If the captured pairing movement data matches, then the mobile communication devices are successfully paired.

26 Claims, 3 Drawing Sheets

(51) Int. Cl.
*H04W 12/04* (2009.01)
*H04W 8/00* (2009.01)
*H04W 4/20* (2009.01)
*H04W 92/18* (2009.01)
*H04W 4/02* (2009.01)

(52) U.S. Cl.
CPC .......... *H04W 4/206* (2013.01); *H04W 8/005* (2013.01); *H04W 12/04* (2013.01); *H04M 2250/12* (2013.01); *H04W 4/023* (2013.01); *H04W 92/18* (2013.01)

(56) References Cited

U.S. PATENT DOCUMENTS

| | | | |
|---|---|---|---|
| 2006/0003700 A1* | 1/2006 | Yasuda | G08B 13/1427 455/41.2 |
| 2007/0124703 A1* | 5/2007 | Sohn | G06F 3/017 715/863 |
| 2008/0039212 A1 | 2/2008 | Ahlgren et al. | |
| 2010/0167646 A1 | 7/2010 | Alameh et al. | |
| 2010/0278345 A1* | 11/2010 | Alsina et al. | 380/283 |
| 2011/0004436 A1* | 1/2011 | Beute | 702/141 |
| 2012/0124662 A1 | 5/2012 | Baca et al. | |
| 2013/0065517 A1* | 3/2013 | Svensson et al. | 455/39 |

FOREIGN PATENT DOCUMENTS

| | | |
|---|---|---|
| EP | 2146490 A1 | 1/2010 |
| JP | 2010-097340 | 4/2010 |
| JP | 2012-113525 | 6/2012 |
| KR | 101125141 B1 | 3/2012 |
| WO | 2014000124 A1 | 1/2014 |

OTHER PUBLICATIONS

Mayrhofer, Rene, et al., "Shake Well Before Use: Intuitive and Secure pairing of Mobile Devices," IEEE Transactions on Mobile Computing, vol. 8, No. 6, Jun. 2009, 15 pages.

European Search Report for Patent Application No. 12879922.8-1870/2868158, dated Jan. 19, 2016, 9 pages.

Office Action and English Translation for Japanese Patent Application No. 2015-511881, dated Dec. 8, 2015, 7 pages.

Chinese Office Action for Patent Application No. 201280073514.9, dated Jul. 3, 2017, 5 pages.

* cited by examiner

DEVICE, METHOD, AND SYSTEM FOR SECURELY PAIRING MOBILE COMMUNICATION DEVICES USING MOVEMENT

BACKGROUND

Mobile communication devices generally allow users and applications executed on the mobile computing devices to share information between devices. Prior to exchanging information between each other, the mobile communication devices must be "paired" in order to build a connection. The pairing process identifies the other mobile device to which future connections will be send. Typically, device pairing is established using a text string or short numeric code (e.g., a "PIN") entered into each device.

Mobile communication devices commonly include numerous sensors, including sensors to detect movement of the mobile communication device, orientation of the mobile communication device, and/or the presence of nearby objects. These numerous sensors may allow for rich interaction with the mobile communication device.

BRIEF DESCRIPTION OF THE DRAWINGS

The concepts described in the present disclosure are illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION OF THE DRAWINGS

Figure 1:
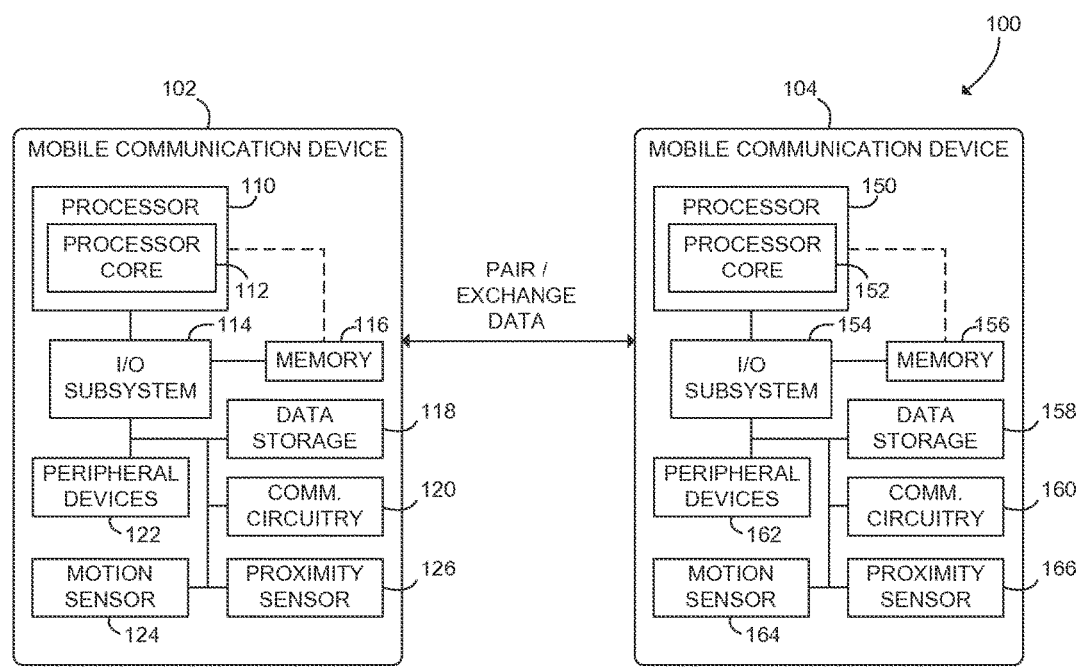
FIG. 1 is a simplified block diagram of at least one embodiment of a system for securely pairing mobile communication devices using movement.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present disclosure. It will be appreciated, however, by one skilled in the art that embodiments of the disclosure may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments of the invention may be implemented in hardware, firmware, software, or any combination thereof. Embodiments of the invention implemented in a computer system may include one or more bus-based interconnects between components and/or one or more point-to-point interconnects between components. Embodiments of the invention may also be implemented as instructions carried by or stored on a transitory or non-transitory machine-readable (e.g., computer-readable) medium, which may be read and executed by one or more processors. A machine-readable medium may be embodied as any device, mechanism, or physical structure for storing or transmitting information in a form readable by a machine (e.g., a computing device). For example, a machine-readable medium may be embodied as read only memory (ROM); random access memory (RAM); magnetic disk storage media; optical storage media; flash memory devices; mini- or micro-SD cards, memory sticks, electrical signals, and others.

In the drawings, specific arrangements or orderings of schematic elements, such as those representing devices, modules, instruction blocks, and data elements, may be shown for ease of description. However, it should be understood by those skilled in the art that the specific ordering or arrangement of the schematic elements in the drawings is not meant to imply that a particular order or sequence of processing, or separation of processes, is required. Further, the inclusion of a schematic element in a drawing is not meant to imply that such element is required in all embodiments or that the features represented by such element may not be included in or combined with other elements in some embodiments.

In general, schematic elements used to represent instruction blocks may be implemented using any suitable form of machine-readable instruction, such as software or firmware applications, programs, functions, modules, routines, processes, procedures, plug-ins, applets, widgets, code fragments and/or others, and that each such instruction may be implemented using any suitable programming language, library, application programming interface (API), and/or other software development tools. For example, some embodiments may be implemented using Java, C++, and/or other programming languages. Similarly, schematic elements used to represent data or information may be implemented using any suitable electronic arrangement or structure, such as a register, data store, table, record, array, index, hash, map, tree, list, graph, file (of any file type), folder, directory, database, and/or others.

Further, in the drawings, where connecting elements, such as solid or dashed lines or arrows, are used to illustrate a connection, relationship or association between or among two or more other schematic elements, the absence of any such connecting elements is not meant to imply that no connection, relationship or association can exist. In other words, some connections, relationships or associations between elements may not be shown in the drawings so as not to obscure the disclosure. In addition, for ease of illustration, a single connecting element may be used to represent multiple connections, relationships or associations between elements. For example, where a connecting element represents a communication of signals, data or instructions, it should be understood by those skilled in the art that such element may represent one or multiple signal paths (e.g., a bus), as may be needed, to effect the communication.

Referring now to FIG. 1, a system 100 for securely pairing mobile communication devices using movement of the devices includes a mobile communication device 102 and a mobile communication device 104 configured to securely pair with each other to exchange data. As discussed in more detail, a user may pair the mobile communication devices 102, 104 using a movement pairing process. To begin, the user places the mobile communication devices 102, 104 close together. The user subsequently moves the mobile communication devices 102, 104 in a pre-determined manner to signify the beginning of a motion pairing process. During the motion pairing process, the user also moves the mobile communication devices 102, 104 in an arbitrary, non-predetermined manner, which embodies the pairing "key" between the mobile communication devices 102, 104. To end the paring process, the user moves the mobile communication devices 102, 104 in a pre-determined manner to signify the end of the motion pairing process. If the mobile communication devices stayed within a secure range during the entire pairing process and if the captured motion of both devices matches, the mobile communication devices 102, 104 are successfully paired and may subsequently exchange data between each other. One way in which the user can ensure the devices stay within the secure range is simply to hold them together in one hand during the movement pairing process.

The disclosed movement-based device pairing process establishes a connection between the mobile communication devices 102, 104 using natural and spontaneous behavior. As such, the user experience of the pairing process may be improved by the lack of complicated passwords or PIN codes, which may be difficult to use. Additionally, the security of the pairing process may be improved by the requirement that both mobile communication devices stay within a secure range, thereby avoiding replay attacks. Security is also improved by the use of relative orientation data to perform more accurate comparisons of device movement.

In the illustrative embodiment of FIG. 1, the mobile communication device 102 includes a processor 110, an I/O subsystem 114, a memory 116, a data storage 118, a communication circuitry 120, and one or more peripheral devices 122. In some embodiments, several of the foregoing components may be incorporated on a motherboard or main board of the mobile communication device 102, while other components may be communicatively coupled to the motherboard via, for example, a peripheral port. Furthermore, it should be appreciated that the mobile communication device 102 may include other components, sub-components, and devices commonly found in a communication and/or computing device, which are not illustrated in FIG. 1 for clarity of the description.

The processor 110 of the mobile communication device 102 may be embodied as any type of processor capable of executing software/firmware, such as a microprocessor, digital signal processor, microcontroller, or the like. The processor 110 is illustratively embodied as a single core processor having a processor core 112. However, in other embodiments, the processor 110 may be embodied as a multi-core processor having multiple processor cores 112. Additionally, the mobile communication device 102 may include additional processors 110 having one or more processor cores 112.

The I/O subsystem 114 of the mobile communication device 102 may be embodied as circuitry and/or components to facilitate input/output operations with the processor 110 and/or other components of the mobile communication device 102. In some embodiments, the I/O subsystem 114 may be embodied as a memory controller hub (MCH or "northbridge"), an input/output controller hub (ICH or "southbridge"), and a firmware device. In such embodiments, the firmware device of the I/O subsystem 114 may be embodied as a memory device for storing Basic Input/Output System (BIOS) data and/or instructions and/or other information (e.g., a BIOS driver used during booting of the mobile communication device 102). However, in other embodiments, I/O subsystems having other configurations may be used. For example, in some embodiments, the I/O subsystem 114 may be embodied as a platform controller hub (PCH). In such embodiments, the memory controller hub (MCH) may be incorporated in or otherwise associated with the processor 110, and the processor 110 may communicate directly with the memory 116 (as shown by the dashed line in FIG. 1). Additionally, in other embodiments, the I/O subsystem 114 may form a portion of a system-on-a-chip (SoC) and be incorporated, along with the processor 110 and other components of the mobile communication device 102, on a single integrated circuit chip.

The processor 110 is communicatively coupled to the I/O subsystem 114 via a number of signal paths. These signal paths (and other signal paths illustrated in FIG. 1) may be embodied as any type of signal paths capable of facilitating communication between the components of the mobile communication device 102. For example, the signal paths may be embodied as any number of point-to-point links, wires, cables, light guides, printed circuit board traces, vias, bus, intervening devices, and/or the like.

The memory 116 of the mobile communication device 102 may be embodied as or otherwise include one or more memory devices or data storage locations including, for example, dynamic random access memory devices (DRAM), synchronous dynamic random access memory devices (SDRAM), double-data rate synchronous dynamic random access memory device (DDR SDRAM), mask read-only memory (ROM) devices, erasable programmable ROM (EPROM), electrically erasable programmable ROM (EEPROM) devices, flash memory devices, and/or other volatile and/or non-volatile memory devices. The memory 116 is communicatively coupled to the I/O subsystem 114 via a number of signal paths. Although only a single memory device 116 is illustrated in FIG. 1, the mobile communication device 102 may include additional memory devices in other embodiments. Various data and software may be stored in the memory 116. For example, one or more operating systems, applications, programs, libraries, and drivers that make up the software stack executed by the processor 110 may reside in memory 116 during execution.

The data storage 118 may be embodied as any type of device or devices configured for the short-term or long-term storage of data. For example, the data storage 118 may include any one or more memory devices and circuits, memory cards, hard disk drives, solid-state drives, or other data storage devices The communication circuitry 120 of the mobile communication device 102 may include any number of devices and circuitry for enabling communications between the mobile communication device 102 and one or more devices or networks as discussed in more detail below. The communication circuitry 120 may be configured to use any one or more, or combination thereof, communication protocols to communicate, such as, for example, a cellular communication protocol (e.g., Wideband Code Division Multiple Access (W-CDMA)), a wireless network communication protocol (e.g., Wi-Fi®, WiMAX), a wireless personal area network communication protocol (e.g., Bluetooth®), a wired network communication protocol (e.g., TCP/IP), and/or other communication protocols.

In some embodiments, the mobile communication device 102 may also include one or more peripheral devices 122. Such peripheral devices 122 may include any number of additional input/output devices, interface devices, and/or other peripheral devices. For example, in some embodiments, the peripheral devices 122 may include a display, touch screen, graphics circuitry, keyboard, speaker system, and/or other input/output devices, interface devices, and/or peripheral devices.

In the illustrative embodiment, the mobile communication device 102 includes a motion sensor 124 and a proximity sensor 126. The motion sensor 124 may be embodied as any type of sensor capable of sensing motion of the mobile communication device including, for example, one or more accelerometers, gyroscopes, or any other type of device or devices capable of detecting the motion of the mobile communication device 102.

The proximity sensor 126 of the mobile communication device 102 allows the mobile communication device 102 to measure distance to another object, without physically contacting the other object. The proximity sensor 126 may be passive or active, and may be embodied as a capacitive sensor, photoelectric sensor, inductive sensor, laser rangefinder, ultrasonic sensor, or the like. In many embodiments, the proximity sensor 126 may be embedded in a front surface of the mobile communication device 102, in order to sense when the mobile communication device 102 is held to the user's ear. Although the illustrative embodiment of FIG. 1 includes only one motion sensor 124 and one proximity sensor 126, the mobile communication device 102 may include additional motion sensors, proximity sensors, and/or other sensors in other embodiments.

The mobile communication device 104 may be substantially similar to the mobile communication device 102 and include similar components, which have been identified in FIG. 1 with a common reference numbering scheme. As such, the description provided above of the components of the mobile communication device 102 is equally applicable to those similar components of the mobile communication device 104 and is not repeated herein so as not to obscure the present disclosure. Of course, it should be appreciated that in some embodiments the mobile communication devices 102, 104 of system 100 may be dissimilar to each other. For example, the mobile communication devices of system 100 may be embodied as various types of communication devices different from each other (e.g., a mobile computer, a tablet computer, a smart phone, or other communication device) and include components typically found in such corresponding communication devices.

Each of the mobile communication devices 102, 104 of the system 100 may be embodied as any type of communication device capable of performing the functions described herein. For example, each of the mobile communication devices 102, 104 may be embodied as, without limitation, a smart phone, a cellular telephone, a handset, a messaging device, a computer, a tablet computer, a laptop computer, a notebook computer, a mobile computing device, a work station, a network appliance, a web appliance, a distributed computing system, a multiprocessor system, a processor-based system, a consumer electronic device, a digital television device, and/or any other communication device configured to securely pair and exchange data.

Figure 2:
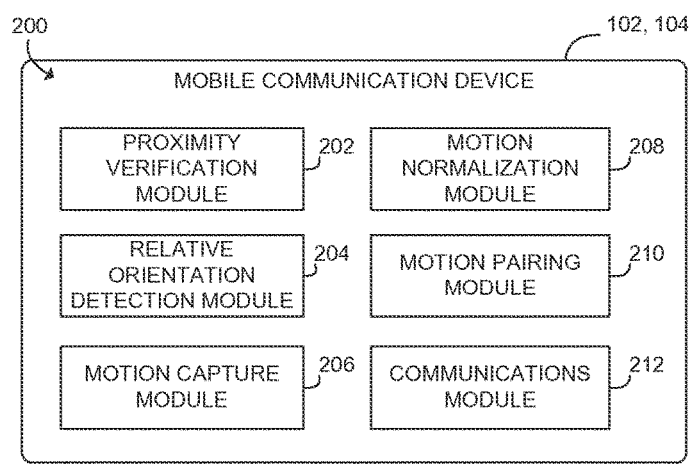
FIG. 2 is a simplified block diagram of at least one embodiment of an environment of a mobile communication device of the system of FIG. 1.

Referring now to FIG. 2, in one embodiment, the mobile communication devices 102, 104 establish an environment 200 during operation. The illustrative environment 200 includes a proximity verification module 202, a relative orientation detection module 204, a motion capture module 206, a motion normalization module 208, a motion pairing module 210, and a communications module 212. The various modules of the environment 200 may be embodied as hardware, firmware, software, or a combination thereof.

The proximity verification module 202 is configured to verify that the mobile communication device 102, 104 remains within a secure range of the other mobile communication device 102, 104 during the pairing process. The proximity verification module 202 may use the proximity sensor 126 to determine the range to the other mobile communication device and provide an indication when the range exceeds the secure range.

The motion capture module 206 is configured to capture the motion of the mobile communication device 102, 104. To do so, the motion capture module 206 may receive motion data from the motion sensor 124 and record such motion data for later comparison as discussed below.

The motion pairing module 210 is configured to compare the captured motion data from each of the mobile communication devices 102, 104, and to permit the pairing process to proceed if the captured motion data matches. In some embodiment, the motion pairing module 210 may be configured to compare the relative change of position of the mobile communication devices 102, 104. That is, for example, captured motion in a forward direct (toward a front side of the mobile communication device 102, 104) followed by captured motion in a backward direction (toward a back side of the mobile communication device 102, 104) may be considered to be the same as motion in the backward direction followed by motion in the forward direction. Additionally or alternatively, in other embodiments, the motion pairing module 210 may compare absolute movement between the captured motion of the mobile communication devices 102, 104 in order to improve comparison accuracy. Such comparisons of absolute movement information may require movement information normalized by the motion normalization module 208 in conjunction with the relative orientation detection module 204.

The relative orientation detection module 204 is configured to determine the relative orientation of mobile communication devices 102, 104. To do so, as discussed in more detail below, the relative orientation detection module 204 receives data from the local proximity sensor 126 and from the other mobile communication device 102, 104 to determine whether the mobile communication devices 102, 104 are oriented face-to-face, back-to-back, or face-to-back.

The motion normalization module 208 is configured to transform the captured motion data based on the orientation of the mobile communication devices 102, 104 as determined by the relative orientation detection module 204. The transformed captured motion data may be used by the motion pairing module 210 to perform a more accurate comparison using absolute, as opposed to relative, position data as discussed above.

The communications module 212 of the mobile communication device 102, 104 is configured to allow communication between mobile communication devices 102, 104 during the pairing process. Additionally, upon successful pairing, the communications module 212 may transfer and/or receive data from the other mobile communication device 102, 104 as required.

Figure 3:
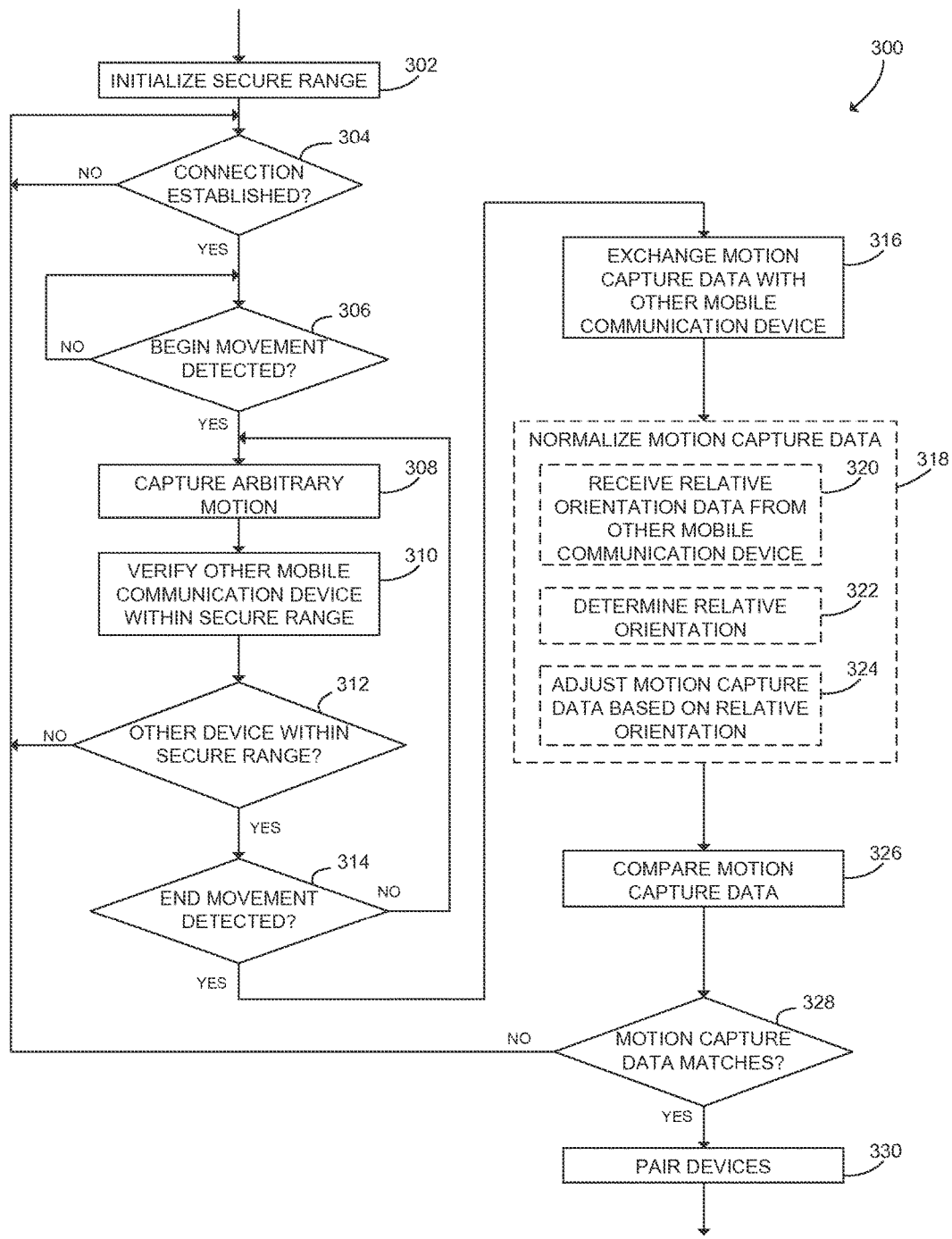
FIG. 3 is a simplified flow diagram of at least one embodiment of a method for securely pairing mobile communication devices using movement, which may be executed by the mobile communication device of FIG. 2.

Referring now to FIG. 3, in use, each mobile communication device 102, 104 may execute a method 300 for securely pairing the other mobile communication device 102, 104 using movement. The method 300 begins with block 302 in which a reference secure range between the other mobile communication devices 102, 104 is initialized or otherwise established. In some embodiments, the secure range may be embodied as a maximum allowable range between the mobile communication devices 102, 104 during the pairing process. That is, the mobile communication devices 102, 104 cannot be separated by a distance greater than the secure range during the pairing process for the paring process to succeed. In other embodiments, the secure range may be an initial range between the mobile communication devices prior to beginning the pairing process, but may not be validated during the pairing process. For example, referring quickly to FIG. 4, the initial range between mobile communication devices 102, 104 is illustrated by distance 402 of schematic diagram 400.

Referring back to FIG. 3, after the secure range has been initialized in block 302, the method 300 proceeds to block 304 in which the mobile communication device 102, 104 determines whether an initial communication connection has been established between the mobile communication devices 102 and 104. The initial communication connection may be used to transfer data between the mobile communication device 102, 104 (e.g., proximity data, motion capture data, etc.) during the pairing process. If a communication connection has not been established, the method 300 loops back to block 304 to wait for a connection.

Figure 4:
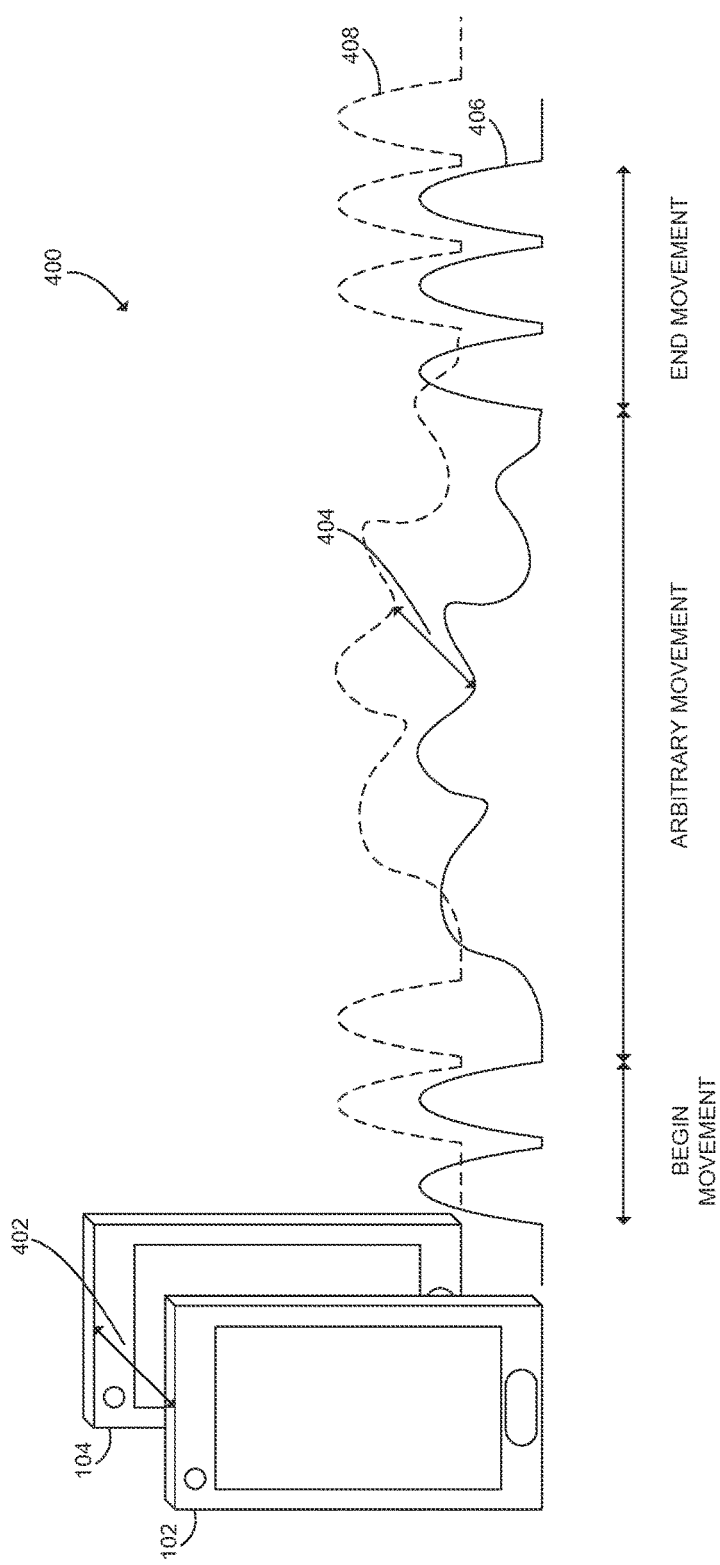
FIG. 4 is a simplified schematic diagram of at least one embodiment of a timeline for the method for securely pairing mobile communication devices using movement of FIG. 3.

If, however, an initial connection has been established, the method 300 advances to block 306 in which the motion capture module 206 of the mobile communication device 102, 104 receives motion information from the motion sensor 124, 164 to determine whether a reference begin movement sequence has occurred. To do so, the motion capture module 206 analyzes the captured motion information to determine whether the captured motion is equivalent to a reference begin movement. The reference begin movement may be embodied as a pre-defined movement sequence; for example, the begin movement may be a movement in which the mobile communication device 102, 104 is shaken twice. Referring quickly to FIG. 4, traces 406 and 408 illustrate one embodiment of motion of mobile communication devices 102, 104 during the pairing process. The begin movement segment of traces 406 and 408 illustrates the mobile communication devices 102, 104 shaken twice.

Referring back to FIG. 3, if the motion capture module 206 detects the reference being movement in the captured motion of the mobile communication device 102, 104, the method 300 advances to block 308. In block 308, the motion capture module 206 captures the subsequent pairing motion for mobile communication device 102, 104. The pairing motion of the mobile communication device 102, 104 may be arbitrary or random in nature, and need not be pre-defined. Referring quickly to FIG. 4, the arbitrary movement segment of traces 406 and 408 illustrates one embodiment of the captured pairing motion.

Referring back to FIG. 3, while the user is moving the mobile communication devices 102, 104 in the pairing motion, the proximity verification module 202 verifies that mobile communication device 102, 104 remains within the secure range to the other mobile communication device 102, 104. Referring quickly to FIG. 4, the measured range between mobile communication devices 102, 104 during pairing movement capture is illustratively represented by distance 404. Referring back to FIG. 3, if the proximity verification module 202 determines that the mobile communication devices 102, 104 are not within the secure range of each other in block 312, the motion capture is stopped, and the method 300 loops back to block 304 to await another connection (or to re-verify the current connection). If, however, the proximity verification module 202 determines that the mobile communication devices 102, 104 are within the secure range of each other in block 312, the method 300 advances to block 314. While the method 300 illustrates verification of the secure range at block 310 following the pairing movement capture of block 308, it should be appreciated that the proximity verification module 202 may verify the secure range at other times in the pairing process and/or substantially in parallel with the pairing process.

In block 314, the motion capture module 206 receives the motion information from the motion sensor 124, 164 to determine whether a reference end movement sequence has occurred. To do so, the motion capture module 206 analyzes the captured motion information to determine whether the captured motion is equivalent to a reference end movement. Similar to the begin movement, the end movement may be embodied as a pre-defined movement; for example, the end movement may be a movement in which the mobile communication device 102, 104 is shaken three times. Referring quickly to FIG. 4, the end movement segment of traces 406 and 408 illustrates the mobile communication devices 102, 104 shaken three times.

Referring back to FIG. 3, if block 314 does not detect the reference end movement, the method 300 loops back to block 308 in which the motion capture module 206 continues capturing the pairing movement data. However, if the motion capture module 206 detects the reference end movement, method 300 advances to block 316 in which the mobile communication devices 102, 104 exchanges captured pairing movement data with each other. That is, using the communications module 212, each mobile communication device 102, 104 receives the captured pairing movement data from the other mobile communication device 102, 104 and sends its captured pairing movement data to the other mobile communication device 102, 104.

In some embodiments, the pairing movement data captured by each mobile communication device 102, 104 may be normalized according to the relative orientation of mobile communication device 102, 104 in block 318. To do so, in block 320, the communications module 212 of the mobile communication device 102, 104 receives relative orientation data from the other mobile communication device 102, 104. The relative orientation data may be embodied as data received from the proximity sensor 126, 166, which provides an indication whether an object is near the face or other surface of the mobile communication device 102, 104. In block 322, the relative orientation detection module 204 determines the relative orientation of the mobile communication device 102, 104 to the other mobile communication device 102, 104 based on the relative orientation data received from the other mobile communication device 102, 104 and the proximity data generated by the local proximity sensor 126, 166. For example, the relative orientation detection module 204 may determine whether the mobile communication devices 102, 104 are oriented front-to-back, front-to-front, or back-to-back by comparing the proximity sensor data generated by the proximity sensors 126, 166.

Subsequently, in block 324, the motion normalization module 208 of each mobile communication device 102, 104 may adjust the captured pairing movement data based on the relative orientation of mobile communication devices 102, 104. For example, if the mobile communication devices are front-to-front or back-to-back, the motion normalization module 208 may modify the captured motion data by transforming captured forward motion into backward motion (or vice versa) and by transforming captured motion to the left (when viewed facing the front of the mobile communication device) into motion to the right (when viewed facing the front of the mobile communication device) or vice versa. As another example, if the mobile communication devices are front-to-back, no transformation of captured motion data may be required.

The method 300 subsequently advances to block 326 in which the motion pairing module 210 compares the captured pairing movement data generated by the local motion capture module 206 and the captured pairing movement data received form the other mobile communication device 102, 104. As discussed above in connection with the motion pairing module 210, the movement data comparison may be based on relative change of position of mobile communication devices 102 and 104, or based on the absolute position of mobile communication devices 102 and 104, using the normalized captured pairing movement data generated in the block 318.

If the motion pairing module 210 determines that the captured pairing movements do not match in block 328, the motion capture is stopped, and the method 300 loops back to block 304 to await another connection (or to re-verify the current connection). If, however, the motion pairing module 210 determines that the captured pairing movements do match, the method 300 advances to block 330 in which the mobile communication devices 102, 104 are paired. Following the successful pairing, the mobile communication devices may exchange data as directed by a user or application (not pictured here).

While the disclosure has been illustrated and described in detail in the drawings and foregoing description, such an illustration and description is to be considered as exemplary and not restrictive in character, it being understood that only illustrative embodiments have been shown and described and that all changes and modifications consistent with the disclosure and recited claims are desired to be protected.

EXAMPLES

Illustrative examples of the devices, systems, and methods disclosed herein are provided below. An embodiment of the devices, systems, and methods may include any one or more, and any combination of, the examples described below.

In one example, a mobile communication device to pair with another mobile communication device using a pairing process may include a proximity verification module, a motion capture module, and a motion pairing module. In an example, the proximity verification module may verify the mobile communication device is within a reference range to the other mobile communication device during the pairing process. In an example, the motion capture module may (i) capture a reference begin movement, (ii) capture, in response to capturing the reference begin movement, an arbitrary pairing movement, and (iii) capture a reference end movement. In an example, the motion pairing module may, in response to capturing the reference end movement, receive a captured pairing movement from the other mobile communication device, compare the received pairing movement with the captured pairing movement, and complete the pairing process in response to the received pairing movement matching the captured pairing movement. In an example, to compare the received pairing movement with the captured pairing movement may include to compare a relative change of position of the mobile communication device to a relative change of position of the other mobile communication device.

Additionally, in an example, the mobile communication device may include a relative orientation detection module and a motion normalization module. In an example, the relative orientation detection module may receive relative orientation data from the other mobile communication device. Additionally, in an example, the motion normalization module may normalize the captured pairing movement in response to the relative orientation data. In an example, to compare the received pairing movement with the captured pairing movement may include to compare an absolute position of the mobile communication device to an absolute position of the other mobile communication device. In an example, to normalize the captured pairing movement in response to the relative orientation data may include to determine, using the relative orientation data, whether (i) a front of the mobile communication device is oriented toward a front of the other mobile communication device, or (ii) a back of the mobile communication device is oriented toward a back of the other mobile communication device, and to transform the captured motion data in response to determining that (i) the front of the mobile communication device is oriented toward the front of the other mobile communication device, or (ii) the back of the mobile communication device is oriented toward the back of the other mobile communication device. In an example, the captured motion data may include a forward component, a backward component, a left component, and a right component. Additionally, in an example to transform the captured motion data may include to (i) transform the forward component of the captured motion data to backward and the backward component of the captured motion data to forward; and (ii) transform the left component of the captured motion data to right and the right component of the captured motion data to left.

Additionally, in an example, the reference range may include a maximum allowable range between the mobile communication device and the other mobile communication device. In an example, the reference range may include an initial range between the mobile communication device and the other mobile communication device prior to capturing the begin movement. Additionally, in an example, the begin movement may include a shaking movement in which the mobile communication device is shaken twice. In an example, the end movement may include a shaking movement in which the mobile communication device is shaken three times.

In another example, a method for pairing a mobile communication device to another mobile communication device may include detecting a reference begin movement, capturing an arbitrary pairing movement in response to detecting the reference begin movement, verifying the other mobile communication device is within a reference range to the other mobile communication device while capturing the pairing movement, detecting a reference end movement, receiving captured pairing movement from the other mobile communication device in response to detecting the reference end movement, comparing, in response to detecting the reference end movement, the captured pairing movement to a captured pairing movement received from the other mobile communication device, and pairing the mobile communication device with the other mobile communication device in response to the received pairing movement matching the captured pairing movement. In an example, comparing the captured pairing movement to the received pairing movement may include comparing a relative change of position of the mobile communication device to a relative change of position of the other mobile communication device. Additionally, in an example, the method may further include initializing the reference range to an initial range between the mobile communication device and the other mobile communication device prior to detecting the begin movement.

Additionally, in an example, the method may further include normalizing the captured pairing movement. In an example, comparing the captured pairing movement to the received pairing movement may include comparing an absolute position of the mobile communication device to an absolute position of the other mobile communication device. In an example, normalizing the captured pairing movement may include receiving relative orientation data from the other mobile communication device, determining the relative orientation of the mobile communication device with respect to the other mobile communication device; and adjusting the captured pairing movement based on the relative orientation of the mobile communication device with respect to the other mobile communication device. Additionally, in an example, the relative orientation of the mobile communication device may include a front of the mobile communication device oriented toward a front of the other mobile communication device, the front of the mobile communication device oriented toward a back of the other mobile communication device, a back of the mobile communication device oriented toward the front of the other mobile communication device, or the back of the mobile communication device oriented toward the back of the other mobile communication device. Additionally, in an example, adjusting the captured pairing movement may include transforming the captured pairing movement in response to the relative position of the mobile communication device including (i) the front of the mobile communication device oriented toward the front of the other mobile communication device or (ii) the back of the mobile communication device oriented toward the back of the other mobile communication device. Additionally, in an example, transforming the captured pairing movement may include transforming forward movement into backward movement and vice versa, and transforming left movement into right movement and vice versa.

In another example, a system for pairing mobile communication devices using a pairing process may include a first mobile communication device and a second mobile communication device. In an example, the first mobile communication device may include a first proximity verification module, a first motion capture module, and a first motion pairing module. In an example, the second mobile communication device may include a second proximity verification module, a second motion capture module, and a second motion pairing module. In an example, the first proximity verification module may verify the first mobile communication device is within a reference range to the second mobile communication device during the pairing process. In an example, the first motion capture module and the second motion capture module may each (i) capture a reference begin movement, (ii) capture, in response to capturing the reference begin movement, a first pairing movement, and (iii) capture a reference end movement. In an example, the first motion pairing module, in response to capturing the reference end movement, may (i) receive a second pairing movement from the second mobile communication device, (ii) compare the first pairing movement with the second pairing movement, and (iii) complete the pairing process in response to the first pairing movement matching the second pairing movement. In an example, the second proximity verification module may verify the second mobile communication device is within the reference range to the first mobile communication device during the pairing process. In an example, second motion pairing module, may, in response to capturing the reference end movement, (i) receive the first pairing movement from the first mobile communication device, (ii) compare the first pairing movement with the second pairing movement, and (iii) complete the pairing process in response to the first pairing movement matching the second pairing movement.

Additionally, in an example, to compare the first pairing movement with the second pairing movement may include to compare a relative change of position of the first mobile communication device to a relative change of position of the second mobile communication device.

In an example, the first mobile communication device may include a first relative orientation detection module and a first motion normalization module, and the second mobile communication device may include a second relative orientation detection module and a second motion normalization module. In an example, the first relative orientation detection module may receive second relative orientation data from the second mobile communication device, and the second relative orientation detection module may receive first relative orientation data from the first mobile communication device. In an example, the first motion normalization module may normalize the first pairing movement in response to the second relative orientation data, and a second motion normalization module may normalize the second pairing movement in response to the first relative orientation data.

Additionally, in an example, to compare the first pairing movement with the second pairing movement may include to compare an absolute position of the first mobile communication device to an absolute position of the second mobile communication device. In an example, to normalize the first pairing movement in response to the second relative orientation data may include to determine, using the second relative orientation data, whether (i) a front of the first mobile communication device is oriented toward a front of the second mobile communication device, or (ii) a back of the first mobile communication device is oriented toward a back of the second mobile communication device, and to transform the first motion data in response to determining that (i) the front of the first mobile communication device is oriented toward the front of the second mobile communication device, or (ii) the back of the first mobile communication device is oriented toward the back of the second mobile communication device. Additionally, in an example, to normalize the second pairing movement in response to the first relative orientation data may include to determine, using the first relative orientation data, whether (i) the front of the first mobile communication device is oriented toward the front of the second mobile communication device, or (ii) the back of the first mobile communication device is oriented toward the back of the second mobile communication device, and to transform the second motion data in response to determining that (i) the front of the first mobile communication device is oriented toward the front of the second mobile communication device, or (ii) the back of the first mobile communication device is oriented toward the back of the second mobile communication device. In an example, the first motion data and the second motion data each may include a forward component, a backward component, a left component, and a right component. In an example, to transform the first motion data may include to (i) transform the forward component of the first motion data to backward and the backward component of the first motion data to forward, and (ii) transform the left component of the first motion data to right and the right component of the first motion data to left, and to transform the second motion data may include to (i) transform the forward component of the second motion data to backward and the backward component of the second motion data to forward, and (ii) transform the left component of the second motion data to right and the right component of the second motion data to left.

Additionally, in an example, the reference range may include a maximum allowable range between the first mobile communication device and the second mobile communication device. In an example, the reference range may include an initial range between the first mobile communication device and the second mobile communication device prior to capturing the begin movement. In an example, the begin movement may include a shaking movement in which the first mobile communication device and the second mobile communication are each shaken twice. In an example, the end movement may include a shaking movement in which the first mobile communication device and the second mobile communication are each shaken three times.

The invention claimed is:

1. A mobile communication device to pair with another mobile communication device using a pairing process, the mobile communication device comprising:
   a proximity verification module to (i) determine, with a proximity sensor of the mobile communication device, whether the mobile communication device is within a reference range to the other mobile communication device during the pairing process and (ii) stop the pairing process in response to a determination that the mobile communication device is not with the reference range to the other mobile communication device during the pairing process;
   a communications module to establish a wireless data connection between the mobile communication device and the other mobile communication device with a wireless communication circuit of the mobile communication device in response to a determination, with the proximity sensor, that the mobile communication device is within the reference range to the other mobile communication device;
   a motion capture module to (i) capture a reference begin movement, (ii) determine that the reference begin movement matches a pre-defined begin movement, (iii) capture, in response to capturing the reference begin movement and determining that the reference begin movement matches the pre-defined begin movement, a first pairing movement, (iv) capture a reference end movement, and (v) determine that the reference end movement matches a pre-defined end movement; and
   a motion pairing module, in response to capturing the reference end movement and determining that the reference end movement matches the pre-defined end movement, to: (i) receive a second pairing movement from the other mobile communication device, (ii) compare the second pairing movement with the first pairing movement, and (iii) complete the pairing process in response to the second pairing movement matching the first pairing movement.

2. The mobile communication device of claim 1, further comprising:
   a relative orientation detection module to receive relative orientation data from the other mobile communication device; and
   a motion normalization module to normalize the first pairing movement in response to the relative orientation data.

3. The mobile communication device of claim 2, wherein to normalize the first pairing movement in response to the relative orientation data comprises:
   to determine, using the relative orientation data, whether (i) a front of the mobile communication device is oriented toward a front of the other mobile communication device, or (ii) a back of the mobile communication device is oriented toward a back of the other mobile communication device; and
   to transform the captured motion data in response to determining that (i) the front of the mobile communication device is oriented toward the front of the other mobile communication device, or (ii) the back of the mobile communication device is oriented toward the back of the other mobile communication device.

4. The mobile communication device of claim 3, wherein:
   the captured motion data comprises a forward component, a backward component, a left component, and a right component; and
   to transform the captured motion data comprises to (i) transform the forward component of the captured motion data to backward and the backward component of the captured motion data to forward; and (ii) transform the left component of the captured motion data to right and the right component of the captured motion data to left.

5. The mobile communication device of claim 1, wherein the reference range comprises a maximum allowable range between the mobile communication device and the other mobile communication device.

6. The mobile communication device of claim 1, wherein the reference range comprises an initial range between the mobile communication device and the other mobile communication device prior to capturing the begin movement.

7. The mobile communication device of claim 1, wherein the begin movement comprises a shaking movement in which the mobile communication device is shaken twice.

8. The mobile communication device of claim 1, wherein the end movement comprises a shaking movement in which the mobile communication device is shaken three times.

9. A method for pairing a mobile communication device to another mobile communication device, the method comprising:

determining, using a proximity sensor of the mobile communication device, whether the mobile communication device is within a reference range to the other mobile communication device;

establishing, busing a wireless communication circuit of the mobile communication device, a wireless data connection between the mobile communication device and the other mobile communication device in response to determining, using the proximity sensor, that the mobile communication device is within the reference range to the other mobile communication device;

detecting a reference begin movement;

determining that the reference begin movement matches a pre-defined begin movement;

capturing a first pairing movement in response to detecting the reference begin movement and determining that the reference begin movement matches the pre-defined begin movement;

determining, using the proximity sensor, whether the mobile communication device remains within the reference range to the other mobile communication device while capturing the first pairing movement;

detecting a reference end movement;

determining that the reference end movement matches a pre-defined end movement;

receiving a second pairing movement from the other mobile communication device in response to detecting the reference end movement and determining that the reference end movement matches the pre-defined end movement;

comparing, in response to detecting the reference end movement and determining that the reference end movement matches the pre-defined end movement, the first pairing movement to the second pairing movement received from the other mobile communication device; and pairing the mobile communication device with the other mobile communication device in response to the second pairing movement matching the first pairing movement and in response to determining that the mobile communication device remained within the reference range to the other mobile communication device while capturing the first pairing movement.

10. The method of claim 9, wherein comparing the first pairing movement to the second pairing movement comprises comparing a relative change of position of the mobile communication device to a relative change of position of the other mobile communication device.

11. The method of claim 9, further comprising initializing the reference range to an initial range between the mobile communication device and the other mobile communication device prior to detecting the begin movement.

12. The method of claim 9, further comprising normalizing the first pairing movement.

13. The method of claim 12, wherein comparing the first pairing movement to the second pairing movement comprises comparing an absolute position of the mobile communication device to an absolute position of the other mobile communication device.

14. The method of claim 12, wherein normalizing the first pairing movement comprises:

receiving relative orientation data from the other mobile communication device;

determining the relative orientation of the mobile communication device with respect to the other mobile communication device; and adjusting the first pairing movement based on the relative orientation of the mobile communication device with respect to the other mobile communication device.

15. The method of claim 14, wherein the relative orientation of the mobile communication device comprises:

a front of the mobile communication device oriented toward a front of the other mobile communication device;

the front of the mobile communication device oriented toward a back of the other mobile communication device;

a back of the mobile communication device oriented toward the front of the other mobile communication device; or the back of the mobile communication device oriented toward the back of the other mobile communication device.

16. The method of claim 15, wherein adjusting the first pairing movement comprises transforming the first pairing movement in response to the relative position of the mobile communication device comprising (i) the front of the mobile communication device oriented toward the front of the other mobile communication device or (ii) the back of the mobile communication device oriented toward the back of the other mobile communication device.

17. The method of claim 16, wherein transforming the first pairing movement comprises:

transforming forward movement into backward movement and vice versa; and transforming left movement into right movement and vice versa.

18. One or more non-transitory, machine-readable media comprising a plurality of instructions that in response to being executed result in a mobile communication device:

determining, using a proximity sensor of the mobile communication device, whether the mobile communication device is within a reference range to the other mobile communication device;

establishing, busing a wireless communication circuit of the mobile communication device, a wireless data connection between the mobile communication device and the other mobile communication device in response to determining, using the proximity sensor, that the mobile communication device is within the reference range to the other mobile communication device;

detecting a reference begin movement;

determining that the reference begin movement matches a pre-defined begin movement;

capturing a first pairing movement in response to detecting the reference begin movement and determining that the reference begin movement matches the pre-defined begin movement;

determining, using the proximity sensor, whether the mobile communication device remains within the reference range to another mobile communication device while capturing the first pairing movement;

detecting a reference end movement;

determining that the reference end movement matches a pre-defined end movement;

receiving a second pairing movement from the other mobile communication device in response to detecting the reference end movement and determining that the reference end movement matches the pre-defined end movement;

comparing, in response to detecting the reference end movement and determining that the reference end movement matches the pre-defined end movement, the first pairing movement to the second pairing movement received from the other mobile communication device; and pairing the mobile communication device with the other mobile communication device in response to the second pairing movement matching the first pairing movement and in response to determining that the mobile communication device remained within the reference range to the other mobile communication device while capturing the first pairing movement.

19. The non-transitory, machine-readable media of claim 18, wherein comparing the first pairing movement to the second pairing movement comprises comparing a relative change of position of the mobile communication device to a relative change of position of the other mobile communication device.

20. The non-transitory, machine-readable media of claim 18, further comprising a plurality of instructions that in response to being executed result in the mobile communication device initializing the reference range to an initial range between the mobile communication device and the other mobile communication device prior to detecting the begin movement.

21. The non-transitory, machine-readable media of claim 18, further comprising a plurality of instructions that in response to being executed result in the mobile communication device normalizing the first pairing movement.

22. The non-transitory, machine-readable media of claim 21, wherein comparing the first pairing movement to the second pairing movement comprises comparing an absolute position of the mobile communication device to an absolute position of the other mobile communication device.

23. The non-transitory, machine-readable media of claim 21, wherein normalizing the first pairing movement comprises:

receiving relative orientation data from the other mobile communication device;

determining the relative orientation of the mobile communication device with respect to the other mobile communication device; and adjusting the first pairing movement based on the relative orientation of the mobile communication device with respect to the other mobile communication device.

24. The non-transitory, machine-readable media of claim 23, wherein the relative orientation of the mobile communication device comprises:

a front of the mobile communication device oriented toward a front of the other mobile communication device;

the front of the mobile communication device oriented toward a back of the other mobile communication device;

a back of the mobile communication device oriented toward the front of the other mobile communication device; or the back of the mobile communication device oriented toward the back of the other mobile communication device.

25. The non-transitory, machine-readable media of claim 24, wherein adjusting the first pairing movement comprises transforming the first pairing movement in response to the relative position of the mobile communication device comprising (i) the front of the mobile communication device oriented toward the front of the other mobile communication device or (ii) the back of the mobile communication device oriented toward the back of the other mobile communication device.

26. The non-transitory, machine-readable media of claim 25, wherein transforming the first pairing movement comprises:

transforming forward movement into backward movement and vice versa; and transforming left movement into right movement and vice versa.

* * * * *